Feb. 4, 1930. J. CLARK 1,745,783
PROCESS OF MAKING MIDDLE RINGS FOR PIPE COUPLINGS
Filed Dec. 29, 1928 3 Sheets-Sheet 1
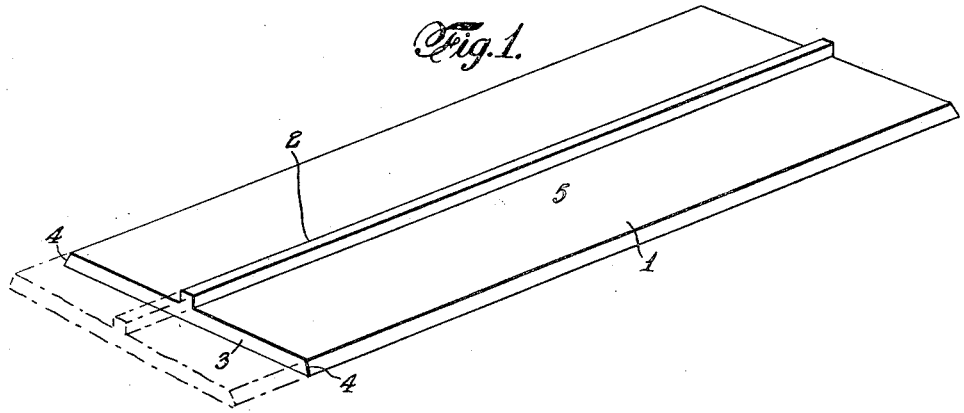
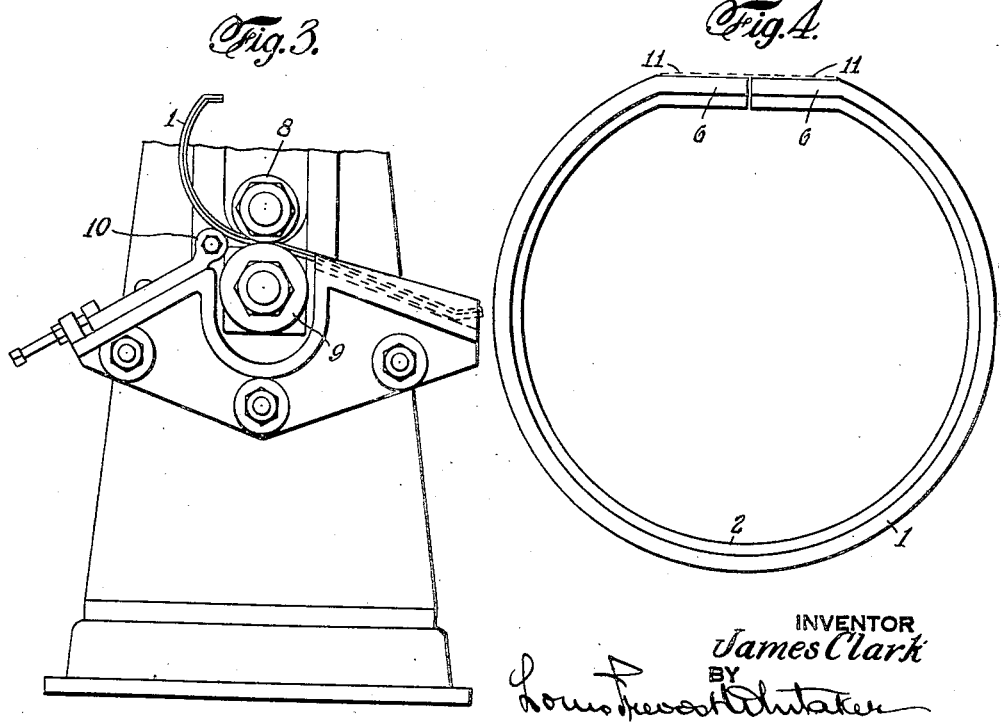
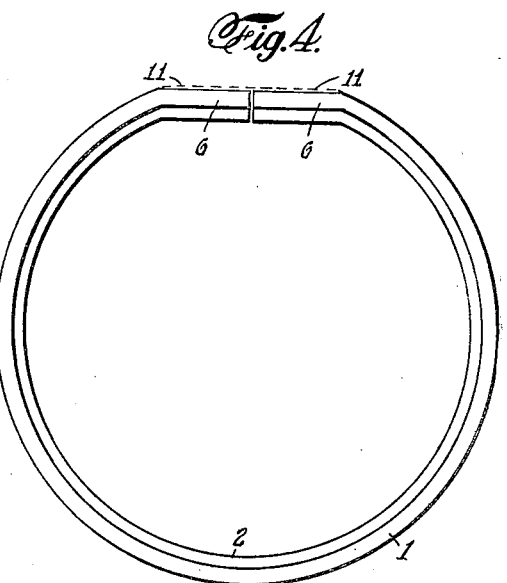
INVENTOR
James Clark
BY
Louis Prevost Whitaker
ATTORNEY Feb. 4, 1930.　　　　J. CLARK　　　　1,745,783
PROCESS OF MAKING MIDDLE RINGS FOR PIPE COUPLINGS
Filed Dec. 29, 1928　　　3 Sheets-Sheet 2
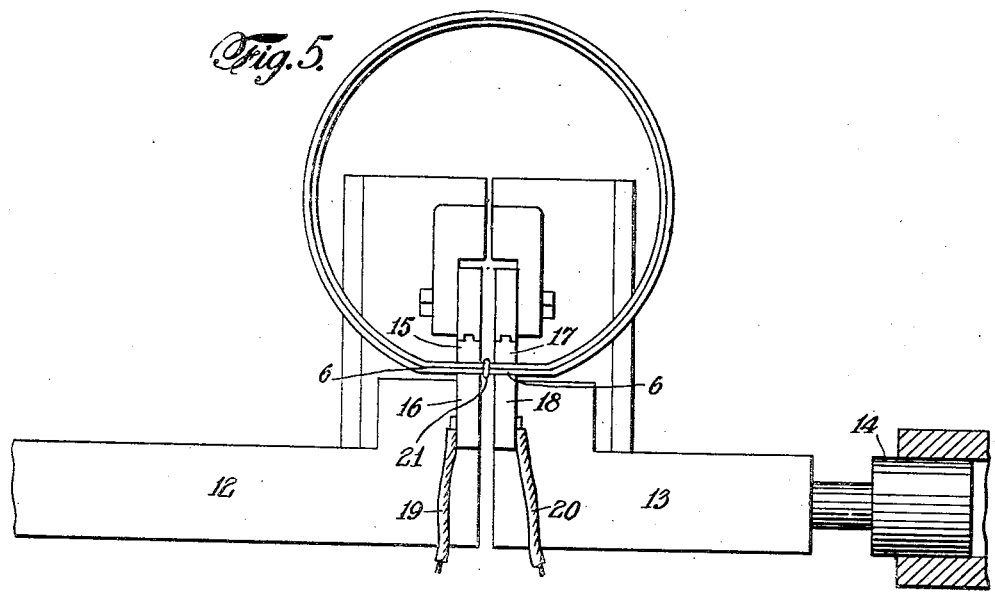
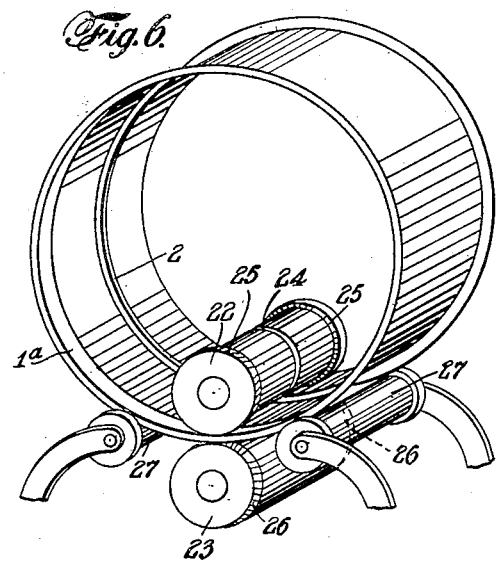
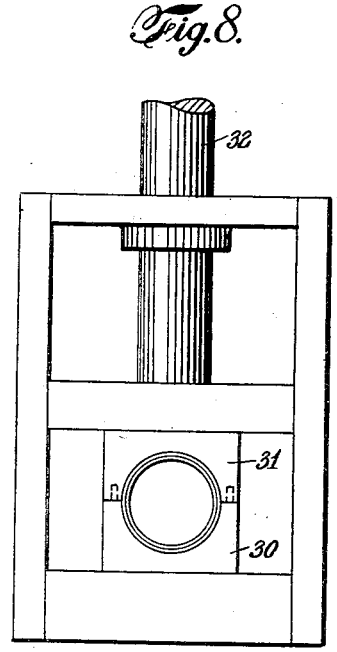
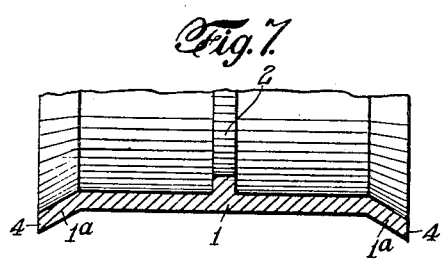
INVENTOR
James Clark
BY
Louis Prevost Whitaker
ATTORNEY Feb. 4, 1930.  J. CLARK  1,745,783
PROCESS OF MAKING MIDDLE RINGS FOR PIPE COUPLINGS
Filed Dec. 29, 1928  3 Sheets-Sheet 3

INVENTOR
James Clark
BY
Louis Prevost Whitaker
ATTORNEY

Patented Feb. 4, 1930

1,745,783

UNITED STATES PATENT OFFICE

JAMES CLARK, OF BRADFORD, PENNSYLVANIA, ASSIGNOR TO S. R. DRESSER MANUFACTURING COMPANY, OF BRADFORD, PENNSYLVANIA, A CORPORATION OF PENNSYLVANIA

PROCESS OF MAKING MIDDLE RINGS FOR PIPE COUPLINGS

Application filed December 29, 1928. Serial No. 329,270.

My invention consists in the novel features hereinafter described, reference being had to th accompanying drawings which illustrate the manner in which I prefer to carry out my improved process, and the said invention is fully disclosed in the following description and claims.

My invention consists in a novel process for the commercial manufacture of wrought metal middle rings for pipe couplings of the well known Dresser type, which are frequently designated as rubber packed pipe couplings, although as a matter of fact the packings employed are not necessarily made of rubber. The middle ring which forms a part of this coupling is ordinarily provided interiorly with inwardly projecting central portions, usually in the form of a central bead or stop, for the purpose of limiting the extent to which the plain or unthreaded end pipe sections with which these couplings are used may be inserted into the ring, and centering the ring over the joint where two pipe sections are connected and the marginal portions of the ring are flared outwardly to form packing recesses to receive end packings which are compressed into the packing recesses and between them and the pipe sections which they surround, by clamping rings usually connected by through bolts and nuts in a well known way.

The problem of manufacturing these rings in the various standard sizes to accommodate various standard sizes of pipes cheaply and accurately, is a difficult one owing to a number of factors among which the following may be mentioned. Economy requires that these rings shall be made of skelp or blanks bent into ring form and welded, which necessarily produces wide variations in the sizes of the rings. The formation of scale on the surface of the wrought metal in the manufacture of the skelp and in heating the same in connection with the formation of the ring also tends to produce variations in the thickness of the metal, and where the ring is hammer welded, in which case the end portions only of the skelp are required to be brought to welding temperature, shortening of the rings at the weld and variations in the thickness of the metal on each side of the weld may result, as hammer welding tends to thin the metal adjacent to the weld. Moreover the portions of the hammer welds at the flared marginal portions of the ring tend to produce inequalities of surface which may result in undesirable effects on the packing and prevent the uniform compression thereof, and thus impair the tightness of the coupling, of which the middle ring forms a part. It has also been customary to standardize these rings while in a heated condition and as no two pieces of metal contract in exactly the same manner on cooling, it is extremely difficult to obtain exact standardization of the interior diameter of the ring when cold under such circumstances.

It will also be understood that these couplings are employed to a very large extent for conveying fluid, such as compressed natural gas and artificial gas for example, under high pressures, which frequently exceed 300 or 400 pounds per square inch and may be considerably higher, and that any defect in the welding which may develop after the coupling is laid in the line will result in the loss of a valuable product in addition to necessitating considerable expense in locating and repairing a defective joint.

In carrying out my present invention, by which the production of accurately standardized wrought metal middle rings which are absolutely fluid tight is insured, I first form a blank of slightly greater length than is required for the ring to be formed therefrom, the said blank having on one face centrally located projecting portions preferably in the form of a bead to serve as a centering stop in the completed ring, the end portions of the blank being substantially perpendicular to the opposite faces and the longitudinal edges being preferably beveled or inclined in a direction toward the beaded face. These blanks may be conveniently formed by rolling a skelp of the desired form and size and of any convenient length, at the rolling mill, and cutting sections therefrom while cold to form the individual blanks. The end portions of the blank are preferably bent angularly in a direction toward the beaded face, after which the intermediate portions of the blank are bent in curved form so as to bring the straight end portions into substantial alignment with each other, these bending operations being performed while the blank is cold. The exterior faces of said end portions are preferably ground or abraded to remove the mill scale to afford good electrical contact with the electrodes of an electric welding machine, preferably of the "flash welding" type, and the end portions of the blank are butt welded electrically while being pressed together so that only a small portion of the metal immediately adjacent to the weld is raised to welding temperature. This butt welding operation produces a transversely extending bead at the inner and outer faces of the weld which is removed in any desired manner, as by grinding or chipping, leaving the ring in approximately circular form, but with a flattened portion.

The ring is now heated throughout and brought into circular form and the marginal portions of the ring are flared outwardly away from the beaded face, which operations are conveniently formed simultaneously by rolling. The ring is then passed through what I term a "hot sizing operation" during which it is subjected to pressure from the outside inwardly so as to bring the interior diameter to a little less than the standard size. The hot sized ring is then cooled, after which it is treated by what I term a "cold sizing operation," by which the portions on opposite sides of the centering stop are expanded slightly while the ring is cold to bring the internal diameter to exact standard size. In order to further insure against the possibility of any leakage occurring when the ring is used, by reason of defects in the weld or otherwise, I prefer finally to place each ring between compressing surfaces provided with packings corresponding with those with which the ring is to be used and introducing a highly compressed fluid, as compressed air for example, into the interior when any pin holes or other defects may be instantly located, by applying soapy water for example to the exterior of the ring.

Referring to the accompanying drawings which illustrate one manner in which my process may be carried into effect, Fig. 1 is a perspective view of a blank for a ring.

Fig. 2 is a side elevation of the same showing the ends bent preliminary to the bending of the central or intermediate portions.

Fig. 3 is an elevation of one form of apparatus which may be conveniently employed for bending the intermediate portions of the blank by a rolling action.

Fig. 4 shows the ring previous to welding.

Fig. 5 is a diagrammatic view showing the manner of electrically welding the abutting ends of the blank.

Fig. 6 is a perspective view illustrating one means for trueing and flaring the welded ring by a rolling action.

Fig. 7 is a partial sectional view of the ring showing the form thereof after trueing and flaring.

Fig. 8 represents diagrammatically one form of apparatus for carrying out the hot sizing operation by compressing the ring.

Figure 9:
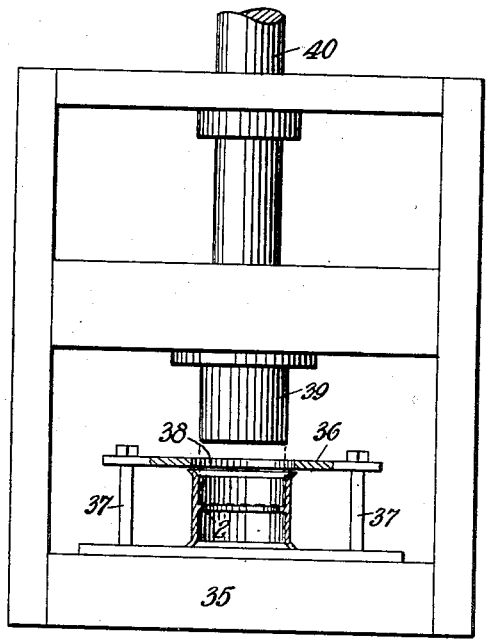
Fig. 9 is a diagrammatic view showing one form of the apparatus for effecting the cold sizing of the ring by expanding it to bring the internal diameter to standard size.

In Fig. 1 of the drawings I have shown the form of blank which I prefer to employ for the manufacture of the middle ring. This blank is formed of wrought metal (as wrought iron or steel) and comprises a flat beaded plate, 1, of slightly greater length than is necessary for the particular ring to be formed, having on one face centrally located projecting portions preferably in the form of a rib or bead, indicated at 2, and having its opposite ends, 3, substantially perpendicular to its upper and lower faces and to its opposite edges. The longitudinal edges of the blank, indicated at 4—4, are slightly beveled so that they converge in a direction toward the beaded face, which is indicated at 5, but this is not absolutely essential. As before stated, I prefer to have the skelp rolled at the rolling mills in the form shown and of any suitable length, from which the individual blanks may be cut by any desired means while the skelp is cold.

The blank is bent into an approximate ring form with the beaded face inside while the metal is cold. For the purpose of facilitating the butt welding operation, I prefer to first bend up a short straight portion at each end of the blank, as indicated in Fig. 2 at 6, the bends being made on transverse lines, indicated by the dotted lines at 7, after which the intermediate portions of the blank between the bends, 7—7, are curved so as to bring the flat end portions, 6—6, into substantial alignment, as indicated in Fig. 4. This bending operation which also takes place while the metal is cold, can be performed in any desired way, as by a suitable roller bending machine, as indicated in Fig. 3, in which the blank is passed between upper and lower feed rolls, 8 and 9, and into contact with an adjustable bending roll, 10, which engages the outer face of the blank and can be set to produce the curvature desired. The upper feed roll, 8, will obviously be provided with a centrally located annular recess to accommodate the bead, 2, of the blank, and the feed rolls are movable with respect to each other to permit the insertion and removal of the blank, thus permitting the bending of the intermediate portions of the blank between the bend, 7—7, and leaving the portions, 6—6, substantially straight as indicated in Fig. 4. The particular bending apparatus forms no part of my present invention and will not be particularly described.

The ring having been formed as previously described and brought into the shape indicated in Fig. 4, I preferably grind or otherwise abrade a portion at least of the surface of the flat end portions, 6—6, in order to remove the mill scale and surface irregularities, and thus permit of a more perfect electrical contact with the electrodes of the electric welding machine. I find it sufficient to grind or abrade the exterior surfaces of the end portions, 6—6, as indicated at 11 in Fig. 4. The abutting ends of the end portions, 6—6, are then welded together to form a butt weld. In Fig. 5, I have indicated diagrammatically an electric flash welding machine which can be conveniently used. This machine comprises a stationary portion, indicated at 12, and a movable portion, indicated at 13, operatively connected with suitable means for moving it toward and from the stationary part either by hand or power. In this instance I have indicated a hydraulic ram at 14 for this purpose. Each of the parts, 12 and 13, is provided with clamping means, indicated respectively at 15, 16, and 17, 18, the parts, 16 and 18, being electrodes of copper or other suitable material and connected by wires, 19 and 20, with the source of electrical current necessary to effect the welding operation. The ring is conveniently placed in the machine, as indicated in Fig. 5, with one of the end portions, 6, clamped between the members, 15, 16, of the stationary part, and the other clamped between the members, 17, 18, of the movable part, 13. The current is passed through the electrodes and the abutting ends of the blank are brought together quickly and with a certain amount of pressure, thereby instantly welding them by a butt welding. Only a very small amount of the metal at either side of the weld will be raised to welding temperature, and the pressure with which the abutting ends are forced together produces a bead surrounding the weld, as indicated at 21 in Fig. 5. The particular construction of the electric welding mechanism forms no part of my present invention and will not be more particularly described herein. Any form of apparatus which will apply the necessary electric current and simultaneously press the abutting ends together may be employed.

After the ring is welded it is necessary to remove the bead, 21, formed by the welding operation. This may be done by grinding, chipping or otherwise, and will bring all the faces of the weld flush with the adjacent surfaces of the ring. The well known form of pneumatic chipping hammer may be conveniently employed for this purpose. It will be noted that the welding operation does not thin the metal adjacent to the weld. In fact it does just the contrary in the formation of the transverse bead, 21, and upon the removal of this bead the welded portion is exactly uniform with the adjacent portions of the ring. In the butt welding process also, there is very little danger of forming an imperfect weld which would permit leakage when the ring is used in a coupling.

The ring thus far formed is not truly circular as it will have a flattened portion produced by the union of the end portions, 6—6, as shown in Fig. 4. It is now placed in a suitable furnace and heated to the desired temperature, (as cherry red) to enable it to be made truly circular and at the same time to permit the flaring of the marginal portions at each end of the ring to form the packing recesses thereof. This is the only heating of the ring in its production, and as it is not necessary to raise it beyond a bending temperature much lower than a welding temperature comparatively little scale will result from this single heating of the ring. I prefer to true the ring and simultaneously flare the marginal portions by a rolling action, although this is not essential, and in Fig. 6 I have illustrated a convenient arrangement of rollers, by means of which the trueing and flaring of the ring may be accomplished. In this figure I have shown for example a pair of feeding and flaring rolls, indicated at 22 and 23, the rollers, 22, being provided with a centrally located annular groove, 24, to accommodate the bead, 2, of the ring, and being provided adjacent to its ends with the outwardly beveled or flared portions, 25—25, for bending outwardly the marginal portions, 1ª, of the ring, to form the desired packing recesses thereof. The roller, 23, is a smooth roller through its central portion, and is provided adjacent to each end with a beveled portion, 26, corresponding with the beveled portions, 25, of the roller, 22, and engaging the outer surfaces of the marginal portions, 1ª. The rollers, 22 and 23, are movable one toward and from the other to permit the insertion and removal of the ring, in any desired way, and to force the rollers together upon the ring so as to true it and flare the marginal portions. In connection with the rollers, 22 and 23, adjustable rollers, 27—27, may also be employed for assisting in supporting the ring while it is being trued and flared. The particular mechanism by which the ring is trued and flared forms no part of my present invention and will not be more particularly described. The trueing and flaring operation is performed upon the ring while it is heated, as before stated, and will give the ring the form illustrated in Fig. 7. It will be seen that when the marginal portions, 1ª, are flared as shown in Fig. 7, the longitudinal edges of the blank, indicated at 4, will be brought into perpendicular relation with the axis of the ring, but as before stated, this is not essential to my present invention. When the ring has been brought to this stage it is still necessary to standardize it, as no two rings made will have exactly the same interior diameter. As previously stated the blank was made longer than necessary for the size of the ring to be made, and a portion of this excess length is taken up in the butt welding operation and the formation of the transverse bead, 21. The excess length of the blank, however, is a little more than sufficient to accommodate the butt welding operation, so that when the ring is trued and flared it will still be slightly larger than the desired size. It is now subjected while in heated condition and preferably immediately after the flaring and trueing operation above described, to a compressing operation between suitable dies. Obviously this hot sizing operation should be performed immediately following the trueing and flaring operation, to avoid a second heating with the resultant production of additional scale, and this further saves the cost of fuel which would be necessitated by second heating.

In Fig. 8, I have shown diagrammatically one form of apparatus for performing the hot sizing operation. This apparatus comprises a stationary die, 30, and a vertically movable die, 31, operatively connected with the plunger, 32, connected with a hydraulic ram or any other means for forcing the dies together. The dies, 30, 31, are shaped to conform to the exterior configuration of the ring, and are of such size that they will compress the ring and decrease its internal diameter to such an extent that when the ring becomes cool its internal diameter will be slightly less than the desired standard diameter for the particular ring which is being made.

After the hot sizing operation the ring is cooled or permitted to cool. I find it convenient to provide a trough down which rings may roll from the hot sizing apparatus to a cooling tank where they are dipped in water or other liquid to cool them, and are then conveyed by rolling in another trough or otherwise, to a point where they are given the final sizing while cold. This cold sizing operation expands the portions of the ring on each side of the central stop or bead, 2, so as to bring the internal diameter of such portions exactly to the standard size required.

In Fig. 9, I have illustrated a convenient means for accomplishing the final or cold sizing of the ring. This figure diagrammatically represents a press having a bed plate, 35, upon which one end of the ring is placed, the opposite end of the ring being conveniently engaged by a stripping plate, indicated at 36, operatively connected with the bed plate as by bolts, 37, in a well known way, the stripping plate being provided with a central aperture, 38, to accommodate a vertically movable die, indicated at 39, the exterior diameter of which is such as to expand the interior diameter of the ring to the standard diameter desired. The die, 39, is operatively connected with suitable power means, as a plunger, 40, connected with a hydraulic ram for example, and this die is forced down into the ring to the centering stop, 2, thereof, and is then withdrawn. The ring is then slid down from under the stripping plate, and turned over on the bed plate and placed coaxially beneath the die, 39, which is then forced into the opposite end of the ring to the stop, 2, and withdrawn as before. This leaves the ring exactly standardized within the tolerances ordinarily allowed in the manufacture of such devices.

Figure 10:
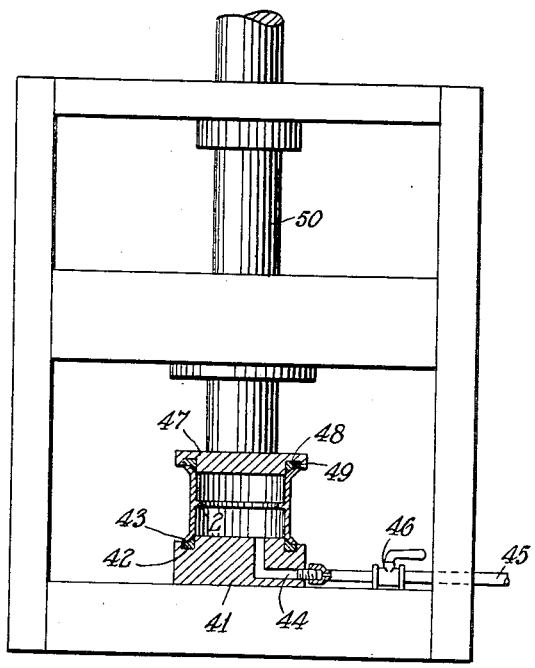
Fig. 10 is a diagrammatic view partly in section showing one form of apparatus for testing the finished rings for leakage.

In the manufacture of middle rings in accordance with my process herein described, there is very little chance that defective rings will be produced, and the rings will ordinarily be commercially satisfactory after the cold sizing operation. Where the rings are to be employed in couplings for pipe lines subjected to high internal fluid pressures and it is particularly desirable to prevent any possibility of the delivery of a ring which will for any reason leak when subjected to such pressure in the line, I prefer to give each ring a fluid pressure test, in connection with exactly the type of packing rings with which the ring is to be employed in the line. I have illustrated in Fig. 10 a convenient means for carrying out this testing of the rings in which 41, represents a bed plate provided with an annular recess, 42, in which is located a packing ring, 43, of the kind and size with which the middle ring is to be used in the line. This bed plate is provided with an inlet passage, 44, for pressure fluid supplied by a pipe, 45, from any suitable source, as a compressed air tank, and controlled by a cock, 46. 47 represents a vertically movable platen, provided with a similar recess, 48, and packing ring, 49, the platen being connected with suitable power applying means, as the plunger, 50, of a hydraulic ram for example, each ring to be tested is placed between the packing rings, 43 and 49, and clamped by the power applying means. The fluid pressure is then turned on and by brushing the exterior of the ring with soapy water for example, or other suitable liquid, any pin holes or leaks will be indicated by a bubble. This testing means forms a very careful and accurate check for any leaks which may exist in the welds or otherwise and insures the production of leak proof rings.

My process is an improvement on the process set forth in U. S. Letters Patent No. 940,414, dated November 16th, 1909, granted to George E. White. The bending apparatus illustrated in Fig. 3 is substantially similar to that disclosed in U. S. Letters Patent No. 849,764, dated April 9th, 1907, granted to George E. White, and the trueing and flaring apparatus which I have illustrated in Fig. 6 is substantially identical with the apparatus shown and described in U. S. Letters Patent No. 848,948, dated April 2nd, 1907, granted to George E. White, but as before stated the particular apparatus employed for carrying my process into effect is not a part of my present invention and is not herein claimed.

It is also to be understood that the various steps of the process may be carried out by hand or by other means than those herein shown and described, and which I have conveniently employed in practice for carrying my invention into effect.

My improved process is preferably carried out as a continuous process, the operations described being performed successively and the blank or ring being transported from point to point where the different operations are performed in any usual or desired manner, for example by means of endless carriers or otherwise. After the ring has acquired circular form so that it will roll readily, it may be transferred conveniently by means of troughs as previously described, if desired.

What I claim and desire to secure by Letters Patent is:—

1. The herein described process for the manufacture of wrought metal middle rings for pipe couplings, which consists in forming a wrought metal blank of greater length than the circumference of the finished ring, bending the blank into approximate ring form, butt welding the meeting ends of the blank by electric welding, heating the ring and flaring the marginal portions to form packing recesses, compressing the ring from the outside inwardly while in heated condition to such an extent that its interior diameter will be less than the desired standard size after the ring has become cold, and expanding the ring outwardly while cold to bring the interior diameter to standard size.

2. The herein described process for the manufacture of wrought metal middle rings for pipe couplings, which consists in forming a wrought metal blank of greater length than the circumference of the finished ring, bending the blank into approximate ring form, butt welding the meeting ends of the blank by electric welding, and pressing the ends of the blank together during the welding and forming a transversely disposed bead at the weld, the length of the blank being sufficient so that the welded ring will be slightly larger than the desired size, removing the bead formed by the welding, flaring the marginal portions thereof to form packing recesses, compressing the ring while still heated from the exterior inwardly to bring its internal diameter to a size slightly less than the standard size desired, and expanding the ring outwardly while cold to bring the interior diameter to exact standard size.

3. The herein described process for the manufacture of wrought metal middle rings for pipe couplings, which consists in forming a wrought metal blank of greater length than the circumference of the finished ring, provided on one face with centrally disposed projecting portions to form a centering stop, and having its end faces substantially perpendicular to the other faces of the blank, bending the ring while cold into approximtae ring form, butt welding the meeting ends of the blank by electric welding, the length of the blank being sufficient to leave the ring after welding of greater internal diameter than that desired for the finished ring, flaring the marginal portions of the ring to form packing recesses, compressing the ring while in heated condition from the exterior inwardly to reduce its internal diameter to such an extent that when cold it will be less than the internal diameter of the finished ring, and expanding the ring while cold to bring the internal diameter to standard size.

4. The herein described process for the manufacture of wrought metal middle rings for pipe couplings, having a centering stop and end packing recesses, which consists in forming a wrought metal blank of greater length than the circumference of the finished ring, provided with centrally located projecting portions on one face to form the centering stop, and having its end faces substantially perpendicular to the other faces of the blank, bending the blank while cold into approximately circular form with the centering stop on the interior, butt welding the meeting ends of the blank by electric welding, and pressing the said ends together during the welding to form a transverse bead at the weld, the length of the blank being sufficient so that when welded it will be of slightly greater size than that of the finished ring, removing the transverse bead, heating the entire ring, flaring the marginal portions of the ring while heated to form packing recesses, compressing the ring from the exterior inwardly while still heated to reduce its internal diameter to such an extent that it will be less when cold than that desired in the finished ring, and expanding the ring on opposite sides of the centering stop to bring the interior diameter to standard size.

5. The herein described process for the manufacture of wrought metal middle rings for pipe couplings, having a centering stop and end packing recesses, which consists in forming a wrought metal blank of greater length than the circumference of the finished ring, and having centrally located projecting portions on one face and end faces substantially perpendicular to the other faces, bending end portions of the blank while cold at an angle to the intermediate portions to form substantially straight end portions, bending the intermediate portions of the blank while cold into curved form to bring said straight end portions into substantial alignment, abrading said end portions to remove scale and surface irregularities to afford good electrical contacting surfaces, welding the meeting ends of said straight end portions together by electric welding and pressing them together during the welding, and forming a transversely disposed bead at the weld, the length of the blank being sufficient so that the ring when welded will be of greater size than desired in the finished ring, removing the said bead formed by the welding operation, heating the entire blank, flaring the marginal portions of the ring while heated by rolling, and imparting a substantially circular form to the ring, compressing the ring from the outside inwardly while heated to reduce its internal diameter to such an extent that when cold the internal diameter will be slightly less than that desired in the finished ring, and expanding the ring while cold from the inside outwardly to bring the interior diameter to standard size.

In testimony whereof I affix my signature.

JAMES CLARK.